Figure 1:
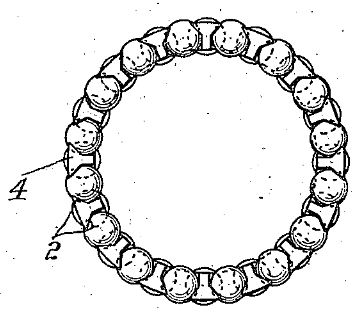

B. EITNER.
CAGE FOR ANTIFRICTION BEARINGS.
APPLICATION FILED NOV. 7, 1914. RENEWED DEC. 14, 1915.

1,168,937. Patented Jan. 18, 1916.

*Attest:*
C. B. Mitchell
E. F. Hatchkiss

*Inventor:*
Berthold Eitner
by Rogers, Kennedy & Campbell Attys

UNITED STATES PATENT OFFICE.

BERTHOLD EITNER, OF BERLIN, GERMANY, ASSIGNOR TO DEUTSCHE WAFFEN- UND MUNITIONSFABRIKEN, OF BERLIN, GERMANY, A CORPORATION OF GERMANY.

CAGE FOR ANTIFRICTION-BEARINGS.

1,168,937. Specification of Letters Patent. Patented Jan. 18, 1916.

Application filed November 7, 1914, Serial No. 870,863. Renewed December 14, 1915. Serial No. 66,819.

*To all whom it may concern:*

Be it known that I, BERTHOLD EITNER, a subject of the Emperor of Germany, residing at Berlin, Germany, have invented certain new and useful Improvements in Cages for Antifriction-Bearings, of which the following is a specification, reference being had therein to the accompanying drawing.

This invention relates to the separating devices or cages which are usually employed between the casing members of antifriction bearings to maintain the rolling elements thereof properly spaced apart, to avoid the contact of the rolling elements with each other and the consequent objectionable friction.

The invention has reference more particularly to cages designed for use in connection with double-row ball bearings, that is, ball bearings in which there are two series of balls between the casing members the function of the cage in such cases being not only to space the individual balls of each series from each other, but also to space the two series from each other. The aim of the invention is to produce a cage for this purpose, of simple construction, which may be economically produced, which will accommodate the maximum number of balls, and which will effectually maintain the balls in such spaced relations that they will be free to rotate individually, and will travel with uniformity in series between the casing members without danger of displacement.

With these ends in view, my invention consists of a cage formed from a strip of sheet metal or other suitable material, bent or folded back and forth sinuously on itself to produce between the folds, two series of loops facing alternately in opposite directions and constituting two circumferential series of ball pockets extending side by side, with two thicknesses of the strip, formed by the folds therein, separating adjacent pockets in each series at the entrance ends of said pockets.

The invention further consists of a cage of the construction stated, in which the portions of the strip forming the folds between adjacent pockets, are spread apart and separated in order to contract the entrance openings to the pockets to prevent the escape of the balls.

The invention is susceptible of different forms of embodiment, the particular form shown being merely by way of example, and being such as I have found in practice to answer to a satisfactory degree the ends to be attained. It will be understood however that other forms of construction may be adopted without departing from the limits of my invention; and further it will be understood that the invention is not limited to any particular form or construction of the parts except in so far as such limitations are specified in the claims.

Figure 2:
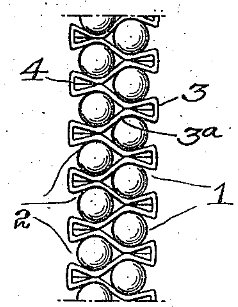
Figure 3:
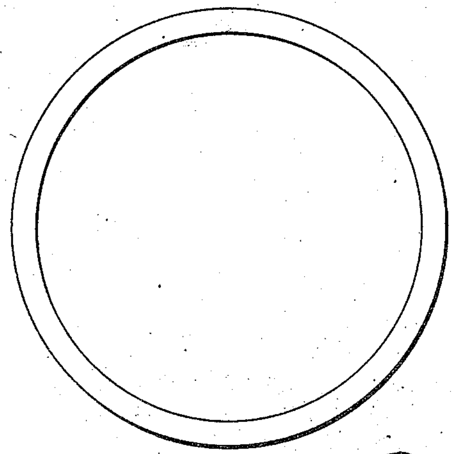

In the accompanying drawings: Figure 1 is a side elevation of a cage constructed in accordance with my invention. Fig. 2 is an edge view of the same. Fig. 3 is an elevation of the blank from which the cage is formed.

Referring to the drawings: As shown in Figs. 1 and 2, my improved cage is of general annular form, and is provided with two series of ball holding pockets 1 and 2, which series of pockets are disposed side by side, with the individual pockets of the series disposed at intervals circumferentially around the cage and with the pockets of one series offset or staggered with relation to the pockets of the other series. The cage is formed from a single strip of thin sheet metal, which strip is preferably in the form of a continuous ring as shown in Fig. 3. The material of the ring is by suitable means bent back and forth on itself into a number of folds 3, thereby forming two circumferential series of loops facing alternately in opposite directions and constituting the two series of ball holding pockets 1 and 2 before alluded to, each pocket being closed at one end and open at its opposite end, and the folded portions 3 of the strip, presenting two thicknesses of material between the open ends of the adjacent pockets in each series. The said two series of pockets are disposed respectively on opposite sides of a medial line extending circumferentially around the cage, and the portions $3^a$ of the strip connecting the opposite folds are extended diagonally so that the pockets of one series will be separated from the pockets of the other series by said diagonal portions, as shown in Fig. 2. The folded portions 3 between the entrance ends of adjacent pockets, are widened as at 4, in order to contract said entrance openings; whereby the balls will be retained in the pockets and will be prevented from escaping in an axial direction. By reason of the character of the material from which the cage is formed the latter will possess considerable resiliency so that the opposite walls of the pockets at their entrance ends may be sprung apart to admit the balls, and when the balls are in place the walls will spring back and resume their former confining positions. The balls may be introduced either by inserting them through the open ends of the pockets in an axial direction, or they may be introduced into the pockets in a radial direction.

As a result of the construction described, the balls of the two series will be maintained in spaced relations out of contact with each other, and also the two series will be separated from each other, the thin character of the material composing the cage enabling the maximum number of balls to be assembled in close relations in the cage without danger of escape or displacement, and the resilient character of the cage permitting the balls to be conveniently introduced therein to adjust themselves without binding, to any unevenness in travel.

Having thus described my invention, what I claim is:

1. A ball holding cage for ball bearings, comprising a strip folded back and forth on itself to produce between the folds, two series of loops facing alternately in opposite directions and constituting two circumferential series of ball-pockets extending side by side, with two thicknesses of the material of the strip separating adjacent pockets in each series, at the entrance ends of the pockets.

2. A ball holding cage for ball bearings, comprising a strip folded back and forth on itself to produce between the folds, two series of loops facing alternately in opposite directions and constituting two circumferential series of ball-pockets extending side by side, the material of the folds between the adjacent pockets, being spread apart to contract the entrance openings to the pockets to prevent the escape of the balls.

In testimony whereof, I have affixed my signature in presence of two witnesses.

BERTHOLD EITNER.

Witnesses:
WOLDEMAR HAUPT,
HENRY HASPER.